Patented Apr. 21, 1925.

1,534,651

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

COMPOSITION.

No Drawing. Original application filed August 9, 1922, Serial No. 580,699. Divided and this application filed March 22, 1923. Serial No. 626,760.

*To all whom it may concern:*

Be it known that I, WILLIAM G. LINDSAY, a citizen of the United States, residing at Newark, in the county of Essex and State of New Jersey, have invented certain new and useful Improvements in Composition, of which the following is a specification.

This invention relates to a process for rendering certain inflammable materials, substances, or compounds, non-inflammable, and to the preparation of a commercially useful non-inflammable article, such as paper, textile fabrics, cellulose plastics, pyroxylin plastics and the like.

The degree of non-inflammability sought for is that which will not permit of a self sustaining combustion, after the application of a flame at ordinary or normal temperature. This degree of non-inflammability will however, be varied according to desired conditions.

I have discovered that inflammable materials which permit of a self sustaining combustion by the application of a flame at ordinary or normal temperature may be prevented from burning under ordinary conditions and rendered non-inflammable provided there is present in suitable combination a heat absorbing compound capable of absorbing or taking up through decomposition, volatilization, or other change, all or the major part of the heat that would be necessary to raise the material or its components to the point at which ignition could be sustained.

This heat absorbing, or endothermic, substance or compound should be of such nature that it will decompose, or otherwise be in condition to absorb heat before or when the temperature of combustion of the material to be rendered non-inflammable has been reached. The absorption of heat will thus proceed at such a rate as to prevent the combustible material from attaining its temperature of ignition. The endothermic substance, or compound will also be selected having in view other characteristics besides its heat absorbing capacity on decomposition in that it may be desired to impart other properties to the resultant product. The relative proportions of the combustible substance, i. e., the substance to be rendered non-inflammable, and endothermic or heat absorbing substance, will be varied somewhat to meet conditions of strength, plasticity, transparency, or other desirable characteristics, but in general will be dependent upon the amount of decomposition, in heat unit equivalents, that can take place at or below the temperature at which combustion could be sustained by the exothermic compound if the heat of combustion were not absorbed at a greater rate than that at which it could be liberated. The general rule is that a sufficient quantity of endothermic substance should be employed to absorb upon its decomposition a sufficient amount of heat to prevent a sustained combustion of the said exothermic substance.

In carrying out my invention, any one of a number of products may do the same. The characteristics of these products may vary from that of a hard, non-moldable, dense solid sheet material which may be used for cutting out various objects such as brush backs, mirror backs, knife handles, etc., to that of a thin, highly flexible product which may be used for the veneering of fabrics, paper and the like or which can be used in place of various textiles and other flexible materials. The flexible compound may also be used as a substitute for leather. It may also possess the necessary characteristics required in compounds that are to be molded such as molded boxes, molded handles, molded brushes, mirrors, etc.

In carrying out the invention the procedure will vary according to the nature and physical properties of the material treated. The exothermic substance which I propose to use will be nitrocellulose, acetylcellulose, or some cellulosic ester, ether, derivative or compound.

In the following examples I give such proportions as will be applicable to compounds containing nitrocellulose, as this is the most inflammable of the cellulose derivatives and any substance that may be incorporated with the nitrate for the purpose of reducing, limiting or preventing combustion will be effective with other compounds of cellulose, and as a matter of fact, with cellulose itself.

The permanent of non-volatile solvents generally referred to as the plasticizing agents and which are to be combined with the pyroxylin or other cellulose derivative for the purpose of bringing about the necessary conversion, etc. in the course of manufacture, should be of such nature that the point of ignition is relatively high. In my experiments I have found that the organic phosphates possess the necessary characteristics of solubility and at the same time possess the requisite temperature of ignition. The most satisfactory results are produced with the aromatic phosphates because of their relatively high stability and resistance to decomposition, and because they possess at the same time the necessary solvent or plasticizing effect on the nitrocellulose, as well as a relatively high ignition point.

To a mixture of nitrocellulose and an aromatic phosphate, as for instance liquid tricresylphosphate, I add a sufficient amount of an endothermic compound, so that when a flame is applied to the resultant product the heat will be absorbed at such a rate as to prevent the material from sustaining ignition (without the application of heat from an external source.)

The group of compounds which I designate as endothermic may be either organic or inorganic in composition. Of the inorganic compounds I have found that there are various acid, basic and neutral salts produced through the combination of one or more of the following acids, with various metallic bases. The following are typical of these acids: Phosphoric, oxalic, fluoric, silicic, hydrosilicic, acetic, boric, sulphuric, tartaric, citric, hydrochloric, formic, and combined with metals of the alkali, alkali earth, or sesquioxide group such as: ammonium, potassium, sodium lithium, calcium, magnesium, barium, aluminum, iron, nickel, zinc, chromium, etc.

In selecting a compound of the class described, the properties other than that pertaining to its endothermic value are to be taken into consideration. While it is possible to make noninflammable materials by the use of water soluble salts, these have in the majority of cases such limited value and use, that under ordinary circumstances their selection would be confined to very special applications, as compounds like boric acid, ammonium oxalate and magnesium sulphate are examples of water soluble endothermic compounds having definite use and application. Also in the matter of action on the pyroxylin itself, I have found that certain basic and in some cases acid compounds, which are soluble in either water or alcoholic solvents, tend to exert a decomposing action and in some cases prevent solubility. I prefer in most cases to use a compound which is substantially insoluble in water and which is either substantially insoluble in the alcoholic menstrua employed or very freely soluble. Partial solubility in the solvent may tend to separation or precipitation on the surface of the finished material.

Of the organic compounds I have found that hexachlorethane, $C_2Cl_6$, and oxamid $(CONH_2)_2$ are good examples of materials of a class that produce very satisfactory results.

Besides the inorganic and organic compounds as just described I have found that there are certain inorganic compounds which exist already formed in nature and which possess the property of preventing combustion when incorporated with pyroxylin in conjunction with a plasticizing agent. The compounds to which I refer are certain hydrosilicates, zeolites, etc. I have obtained satisfactory results by the use of Alophane, $Al_2O_3 3SiO_2 5H_2O$;
Colemanite, $Ca_2B_6O_{11}.5H_2O$;
Chrysocolla, $CuSiO_3.2H_2O$;
Ulexite, $Na_2O.2CaO5B_2O_3 16H_2O$;
Vivianite, $Fe_3(PO_4)_2.8H_2O$;
Wavellite, etc. $Al_3(OH)_3(PO_4).4½H_2O$.

In using these natural compounds, it is necessary to reduce them to a very fine state of subdivision. The particles should be reduced to the size of 1/600 of an inch or less to produce the best results.

While it is possible to produce satisfactory results with a natural mineral compound, more satisfactory results are to be obtained from the use of a compound of the same composition produced synthetically. I refer particularly to synthetic ulexite and synthetic colemanite. In the use of the synthetic article, it is not necessary to use such a high proportion, the temperature of decomposition apparently being much lower which apparently increases the heat absorbing capacity.

As specific examples of the compounds of the groups just described I may specify the following:

Aluminium fluoride, $Al_2F_6.7H_2O$.
Aluminum phosphate, $AlPO_4.XH_2O$.
Aluminum hydrate, $Al_2O_3.3H_2O$.
Basic aluminum acetate, $Al(C_2H_3O_2)_2OH$.
Berillium acid phosphate, $BeHPO_4.2H_2O$.
Boric acid, $B(OH)_3$.
Calcium phosphate, $CaHPO_4.2H_2O$.
Calcium sulphate, $CaSO_4.2H_2O$.
Calcium tartrate, $CaC_4H_4O_6.4H_2O$.
Calcium citrate, $Ca_3(C_6H_5O_7)_2.4H_2O$.
Calcium borate, $(2CaO.3B_2O_3.5H_2O$.
Hydrazine sulphate, $N_2H_4.H_2SO_4$.
Lithium phosphate, $Li_3PO_4.H_2O$.
Magnesium phosphate, $MgHPO_4.7H_2O$.
Magnesium oxychloride, $Mg_2OCl_2 16H_2O$.
Magnesium sulphate, $MgSO_4.7H_2O$.
Nickel phosphate, $Ni_3(PO_4)_2.7H_2O$.
Zinc oxychloride, $ZnO3ZnCl_2 xH_2O$.
Aluminum oxychloride,
$$Al_2O_3 3AlCl_3.3H_2O.$$
Ammonium oxalate, $(NH_4)_2C_2O_4.H_2O$.
Ammonium aluminum fluoride,
$$AlF_6(NH_4)_3.$$

Of the above compounds, I find the most satisfactory results are produced by the use of aluminum phosphate, calcium sulphate, lithium phosphate, calcium tartrate, oxamid and in some cases hexachlorethane.

In order to determine the suitability of an endothermic compound for the production of non-inflammable materials of the class described, it is only necessary to determine the temperature at which it decomposes and to determine its heat absorbing power in a suitable calorimeter. When tested in such apparatus the compound should show a minimum heat absorbing value corresponding to about 260 B. t. u. per pound, that is, one pound of the compound should absorb approximately 260 B. t. u. when heated from ordinary temperature to approximately 200° C. Its decomposition point should be from approximately 110 to 250° C. In general the proportion of endothermic compound to be employed will depend upon its heat absorbing value and upon the degree of non-inflammability to be attained. Calcium sulphate $CaSO_4 2H_2O$ when tested according to this method will show a heat absorbing value of 297 B. t. u. per pound when heated up to 200° C. or thereabouts; calcium tartrate will show a heat absorbing value of 470 B. t. u. per pound when heated up to 230° C. In using precipitated calcium sulphate of the formula $CaSO_4.2H_2O$ in the production of a non-inflammable compound, I have found that a compound substantially completely non-inflammable can be produced by incorporating with 100 parts of pyroxylin, 75 parts of liquid tricresylphosphate and 125 parts of calcium sulphate. Material of this composition when manufactured according to the usual methods as obtain in the pyroxylin plastic industry, will possess hardness, toughness and moldability in similar degree to the usual varieties of celluloid, manufactured in the form of ivory, opaque colors and the like.

In the manufacture of these non-inflammable compounds I proceed substantially as in the manufacture of ordinary pyroxylin plastic materials incorporating the endothermic compound with the soaked or colloidized mass of pyroxylin and liquid tricresylphosphate prior to final mastication on the rolls. This incorporation may be effected in kneaders or the endothermic compound may be directly added during the course of mastication on the rolls. The endothermic compound may also be incorporated with the pyroxylin in the same operation in which the liquid tricresylphosphate is incorporated, the method for which is described in my U. S. Patent No. 1,233,374, granted July 17, 1917.

In the choice of liquid volatile solvent, I may select any one or a combination of a number of the common ordinary solvents, such as methyl alcohol, ethyl alcohol, acetic ether, acetone, amyl acetate, or the various commercial grades and mixtures of these compounds as are ordinarily found upon the market.

In the manufacture of the flexible non-inflammable compound having the properties of leather and the like, I proceed as in the example specified but instead of employing 75 parts of liquid tricresylphosphate, I increase the amount to 200 parts to 100 parts pyroxylin. Material of this composition may be worked up according to the usual method for the manufacture of pyroxylin plastic compounds and produced in the form of sheets by shaving from a block, or it may be dissolved in a suitable proportion of solvent such as wood alcohol, acetone and the like and spread upon a suitable surface such as a textile fabric, leather and the like.

This application is a division of my application Serial No. 580,699, filed August 9, 1922.

I claim:

1. A composition comprising a cellulosic material and an aluminum fluoride.

2. A composition comprising a cellulosic material and an aromatic phosphate in admixture with an aluminum fluoride.

3. A composition containing a cellulosic ester and an aromatic phosphate and in close association therewith an aluminum fluoride.

4. A composition containing a cellulose ester and an aluminum fluoride.

5. A composition containing a cellulose ester and tricresylphosphate in admixture with an aluminum fluoride.

6. A composition containing pyroxylin and an aluminum fluoride.

7. The process of making a non-inflammable material which consists in mixing a cellulose derivative with an aromatic phosphate and with an aluminum fluoride.

8. A composition comprising a cellulose derivative and ammonium aluminum fluoride.

9. A composition comprising a cellulose derivative, an aromatic phosphate and ammonium aluminum fluoride.

10. A composition comprising a pyroxylin, tricresylphosphate and ammonium aluminum fluoride.

11. A composition comprising a cellulose derivative, a plasticizing agent and a fluorine compound of aluminum which absorbs heat on decomposition.

WILLIAM G. LINDSAY.

Certificate of Correction.

It is hereby certified that in Letters Patent No. 1,534,651, granted April 21, 1925, upon the application of William G. Lindsay, of Newark, New Jersey, for an improvement in "Composition," errors appear in the printed specification requiring correction as follows: Page 1, line 71, for the words " do the same " read *be the aim;* and line 104, for the word " of " read *or;* page 2, line 35, after the word " sodium " insert a comma; same page, line 107, for " $Al_2O_3.3H_3O$ " read *$Al_2O_3.3H_2O$.;* and that the said Letters Patent should be read with these corrections therein that the same may conform to the record of the case in the Patent Office.

Signed and sealed this 30th day of June, A. D. 1925.

[SEAL.]

KARL FENNING,
*Acting Commissioner of Patents.*